Figure 1:
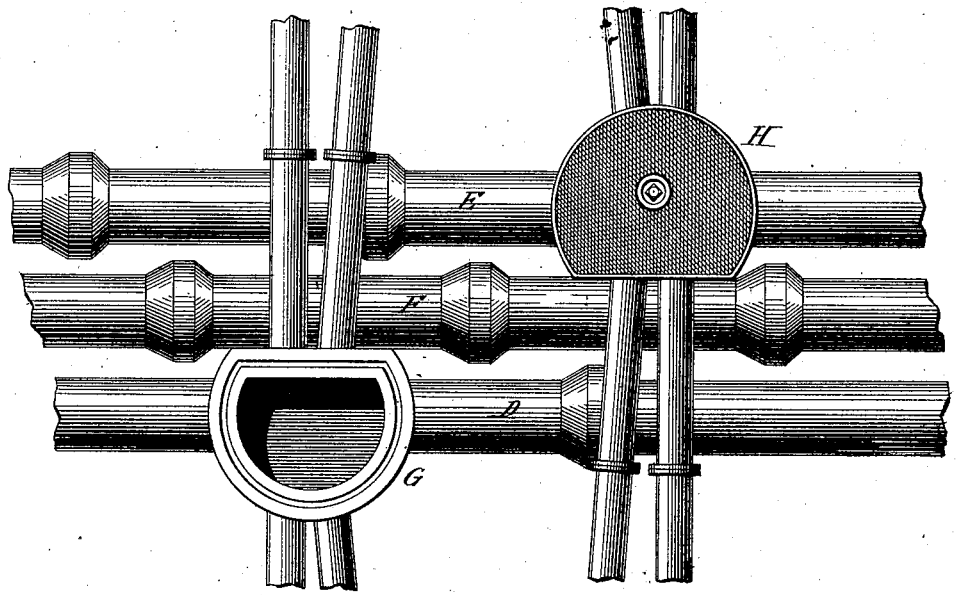

(No Model.)
2 Sheets—Sheet 1.

D. H. DORSETT.
CONDUIT FOR ELECTRIC CONDUCTORS.

No. 340,432.
Patented Apr. 20, 1886.

WITNESSES:
Raymond R. Barnes
Jas. Daniel Compton.

INVENTOR
Daniel H. Dorsett
BY Parker W. Page
ATTORNEY (No Model.) 2 Sheets—Sheet 2.

D. H. DORSETT.
CONDUIT FOR ELECTRIC CONDUCTORS.

No. 340,432. Patented Apr. 20, 1886.

WITNESSES:
Raymond F. Barnes.
Jas. Daniel Compton.

INVENTOR
Daniel H. Dorsett,
BY
Parker W. Page.
ATTORNEY

UNITED STATES PATENT OFFICE.

DANIEL H. DORSETT, OF CHICAGO, ILLINOIS.

CONDUIT FOR ELECTRIC CONDUCTORS.

SPECIFICATION forming part of Letters Patent No. 340,432, dated April 20, 1886.

Application filed October 15, 1885. Serial No. 179,962. (No model.) Patented in England October 30, 1885, No. 13,109.

*To all whom it may concern:*

Be it known that I, DANIEL H. DORSETT, a citizen of the United States, residing at Chicago, in the county of Cook and State of Illinois, have invented certain new and useful Improvements in Conduits for Electric Conductors, of which the following is a specification, reference being had to the drawings accompanying and forming a part of the same.

In underground systems it is often desirable to insulate and protect one, two, or a small number of conductors. Especially is this desirable in cases where branch pipes or conduits are used connecting with larger main lines. In another application I have shown and described such a system, and while my present invention relates more particularly to the construction of the branch pipes in this system, yet the said pipes are generally useful and applicable to underground systems of many different kinds.

The application referred to is of even date herewith, and numbered 176,691.

With a view more especially to providing economical and effective underground protection in cases of this kind, I have constructed a conduit in the following manner: I place a metal pipe, preferably iron, around one or more smaller tubes or rods of brass, iron, or steel fixed at one end to a stationary support. I then pack in around the rods a plastic insulating material consisting of the residuum from partially-distilled coal-tar, crude petroleum, paraffine, silicious sand, pulverized ashes and cinders, oxide of manganese, and ammonium chloride, in the proportions hereinafter stated. This compound is sufficiently soft when hot to be introduced into the pipe and tamped down around the rods. When the space in the pipe has been filled, the rods are drawn out and the compound cooled, so that it becomes very hard.

The number of rods will depend on the number of wires which the pipe is designed to contain. I prefer to string one wire in each passage formed, and the rods should be of sufficient diameter to leave a passage through which the wires may be readily drawn. There should be about three-quarters of an inch space between the walls of one of these passages and the inner surface of the pipe, or between any two passages.

The inclosing-pipe may be in sections several feet in length, and the sections may have any well-known or convenient form of coupling or joint.

In the drawings I have shown several forms, and I shall now refer to the same for a more detailed description of the device.

Figure 2:
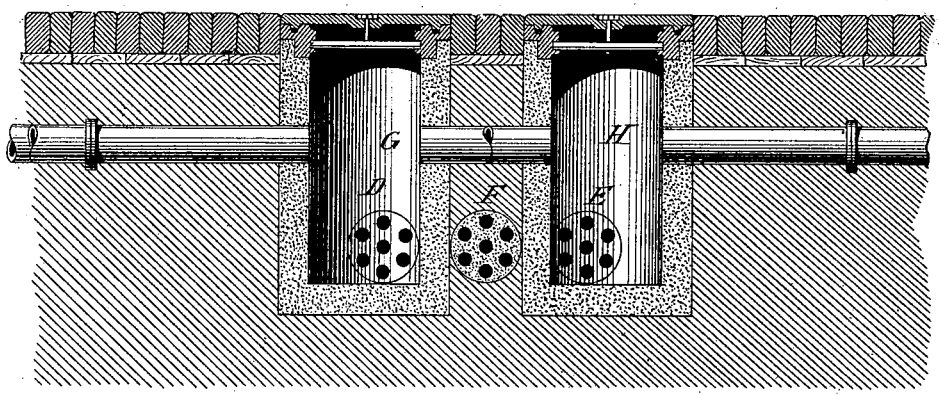
Figure 3:
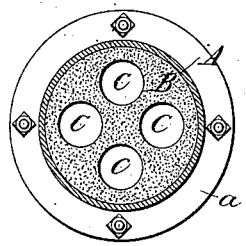
Figure 3:
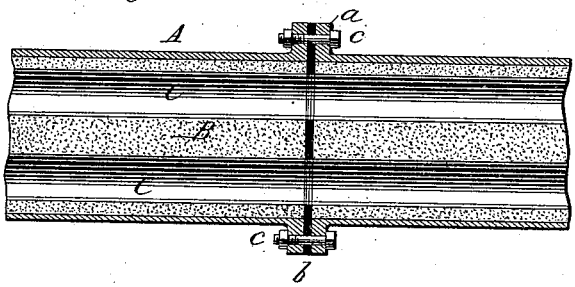
Figure 4:
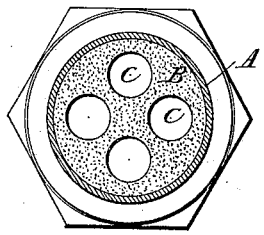
Figure 4:
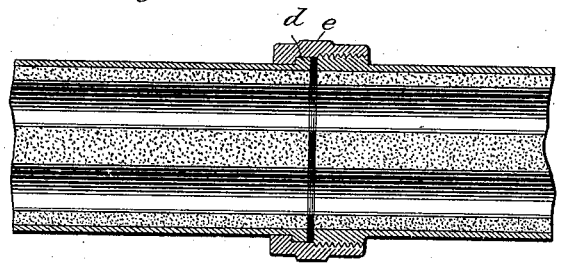
Figure 5:
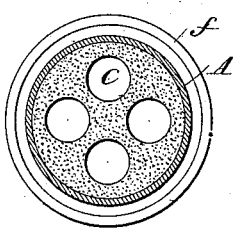
Figure 5:
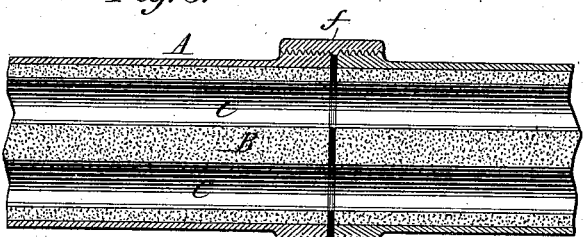
Figure 6:
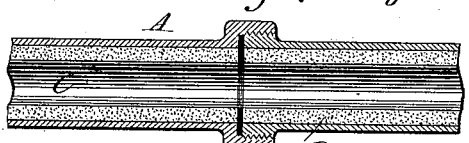

Figure 1 is a plan view of a part of the underground system to which, as before explained, my invention is especially applicable. Fig. 2 is a broken vertical section taken through the centers of the junction-boxes or man-holes. Figs. 3, 4, and 5 are longitudinal and transverse sections of pipes constructed in accordance with my invention, and provided with different forms of coupling or joint. Fig. 6 is a longitudinal section of a form of joint suited to pipes containing but one passage for wires.

Similar letters of reference indicate corresponding parts in all the figures.

Referring to Figs. 3 to 6, inclusive, A designates an ordinary iron or other rigid metal pipe; B, the filling of insulating material, and C the passages for the wires.

The compound which I use for the filling is one composed of the ingredients above specified, in about the following proportions: Fifty gallons of coal-tar before distillation, two gallons of paraffine, one hundred and fifty pounds of silicious sand, fifty pounds of ashes and cinders, two pounds of the oxide of manganese, and one of ammonium chloride. These materials are thoroughly mixed and heated.

The particular manner of making the pipe is immaterial. The simplest process of which I am aware is to pass a section of pipe over the desired number of rods or tubes and to fill in the space remaining in the pipe with the material while hot and soft, tamping it down to render it solid. Then, when the pipe is filled, the tubes or rods are drawn out, leaving the passages through the insulating-filling. The latter becomes very hard when cold and adheres firmly to the pipe.

The pipe itself may be in cross-section round, square, hexagonal, or of other desired shape, and the ends are provided with any suitable form of coupling.

In Fig. 3, the ends of the sections are provided with flanges a, and two contiguous sections are united by clamping the flanges together over a washer or gasket, b, by means of bolts and nuts c.

In Fig. 4 the coupling shown is a form of union-coupling—that is, one section of pipe has a plain flange, d, over which is a threaded sleeve, e. The end of the next section is enlarged and threaded to connect with the sleeve.

In Fig. 5 the ends of both sections are threaded and joined by an internally-threaded coupling, f. These forms of coupling are adapted for use with pipes containing two or more insulated passages. When only one central passage is used, the common form of screw-joint is suitable. Of this form Fig. 6 is an illustration.

In practice I use these pipes in the systems partially illustrated in Figs. 1 and 2. In these figures, D represents the main-line pipe or conduit for containing the circuits of local telephone or telegraph systems, and E a similar conduit for electric-light or power circuits. F is a main trunk-line conduit for telegraph-lines. These pipes are made entirely of the insulating compound used in the interior of the iron pipes above described. The mains are however buried at such a depth and are of such size that this is practicable.

For the branch pipes, or those which carry the branch circuits off to the houses along the way, I use the iron pipes filled with the insulating compound. These pipes are much smaller and are near the surface, and great economy is secured by the use of the filled iron pipes. The wires are brought up from the mains through what I term "hand-holes," designated by G H. These are boxes or chambers made of the same material as the mains and closed with a suitable cover. The ends of the branch pipes are simply inserted through the walls of the boxes, and in any space that may be left some of the insulating material in a soft state is packed. I do not claim herein this particular arrangement of pipes, the same being shown merely for the purpose of illustrating the uses and advantages of the iron pipes filled with the insulating compound in the manner set forth.

I am aware that iron and other pipes have been filled with insulating compounds for the protection of electric conductors; so far as I am aware, however, the wires are either embedded in the material, or else the insulating material has been previously molded in blocks which are inserted in the pipe. My invention differs from these in several important particulars. The wire-passages are formed in a completed pipe and the wire afterward introduced as needed. The pipe or conduit is solid and durable, the material used having the property of adhering perfectly to the iron.

What I claim is—

An underground conduit composed of sections each formed of an iron casing or tube with couplings, and a filling of insulating compound composed of coal-tar, paraffine, silicious sand, pulverized ashes and cinders, oxide of manganese, and ammonium chloride, the said filling being provided with one or more passages or ducts for containing electric conductors, all as set forth.

DANIEL H. DORSETT.

Witnesses:
JAS. DANIEL COMPTON,
PARKER W. PAGE.